Figure 1:
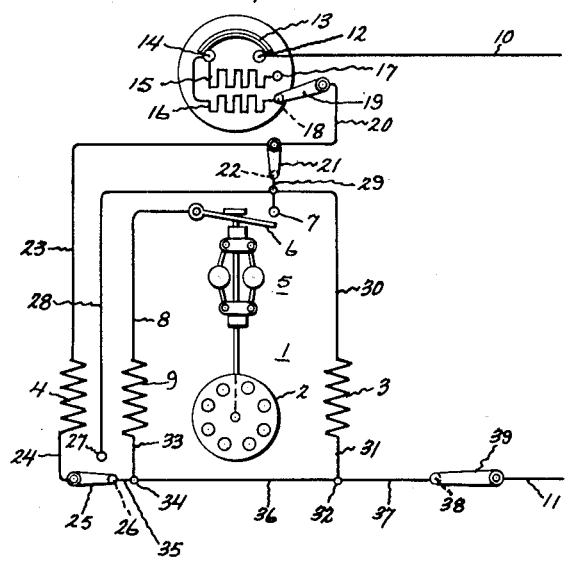

Feb. 7, 1956 R. E. SEELY 2,734,158
PROTECTIVE ARRANGEMENT FOR DUAL-VOLTAGE MOTOR
Filed Dec. 29, 1954

Inventor:
Richard E. Seely,
by Robert G. Iris
His Attorney.

United States Patent Office 2,734,158
Patented Feb. 7, 1956

2,734,158
PROTECTIVE ARRANGEMENT FOR DUAL-VOLTAGE MOTOR

Richard E. Seely, Fort Wayne, Ind., assignor to General Electric Company, a corporation of New York Application December 29, 1954, Serial No. 478,396

4 Claims. (Cl. 318—221)

This invention relates to dynamoelectric machines, and more particularly to protective circuits for dual-voltage electric motors.

There are many applications for electric motors which will operate at two line voltages. It is common practice to provide protection for the windings of such motors, so that the line connection to the windings will be broken when the windings reach a certain temperature or the current through the windings reaches a certain level. A previous method of providing such protection has been to connect a bimetallic element and a heating coil in series with the motor windings. The bimetallic element and the heater coil are generally in series with each other, with the coil being physically adjacent the element so that heat therefrom will be transferred to the element. It is clear that operation of a motor at two different voltages will cause two different amounts of current to pass through the motor circuit and cause heating of the coil and the element at different rates. For instance, if one of the operating voltages is double the other, the current at the lower voltage will be about twice that at the higher voltage. Since it is the current that causes heating of the windings and requires the provision of protection means, it will be seen that the placing of a bimetallic element in series with the motor windings will result in different speeds of actuation of the protector at the different voltages. In order to achieve a like amount of current passing through the heating element at the different voltages, it has heretofore been a frequent custom to connect one of the running windings in parallel with the heating element when the motor is operated at the lower voltage. While this has substantially equalized the current through the heating element, it does not equalize the current through the bimetallic element for the two voltages, and has the added disadvantage that a burn-out of the heating element may still permit energization of the winding connected in parallel therewith.

For reasons of economy and consistency, it is highly desirable that the motor circuit be opened at a specific temperature or current level in any one winding, whatever the line voltage impressed across the motor circuit. In order to approach this goal, it has heretofore been necessary to use a bimetallic element having a very low resistance since otherwise the difference in current flow through the element itself would cause it to heat up to different temperatures for the same individual winding currents depending upon the voltage used, and the circuit would be broken at different winding currents and temperatures for the two different voltages. Thus, it has been necessary that most of the heat required to cause the bimetallic element to open the circuit should come from the heater coil. Under such circumstances, it has been found that the heating coils in many protective devices will be caused to melt when carrying the locked rotor current of a motor. This has two disadvantageous aspects: replacement is required; and, more serious, one winding of the motor may burn out if it is connected in parallel with the heater coil as is frequently the case.

It will be seen from the foregoing that, previously, where bimetallic elements were used to protect dual-voltage motors, either the windings would be disconnected at different current and temperature levels, or else, where low resistance bimetallic elements were used, the heating element would be subject to failure. It is clear that if a high resistance bimetallic element could effectively be used in a dual-voltage motor, more heat could be generated in the element itself so that less heat would need to be generated in the heater coil which would, in turn, permit a substantially longer life for the heater coil. In addition, it is desirable that all the windings of the motor be in series with both the bimetallic element and the heating element at each operating voltage so that the possibility of continued energization of a winding after a burn-out of the heating element be precluded.

It is, therefore, an object of this invention to provide a dual-voltage motor protector arrangement which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, provides a dual-voltage motor including a pair of windings connected in parallel when the motor is operated at a first lower voltage and connected in series when the motor is operated at a second higher voltage. Means for protecting the windings from excessive heating are provided which include a bimetallic element in series with the windings and heating means comprising first and second predetermined resistances adjacent the bimetallic element. The first predetermined resistance is connected in series with the windings when the windings are connected in parallel, and the second predetermined resistance is connected in series with the windings when the windings are connected in series. This provision of separate predetermined resistances for the two voltages at which the motor is operated means that each resistance may be selected with special regard to the circuit arrangement with which it will be used. This in turn will permit the use of a medium or relatively high resistance bimetallic element since the heating resistance may be selected so as to compensate and to cause disconnection of the motor windings at the same temperature and at the same individual winding current for the two different voltage operations.

Figure 2:
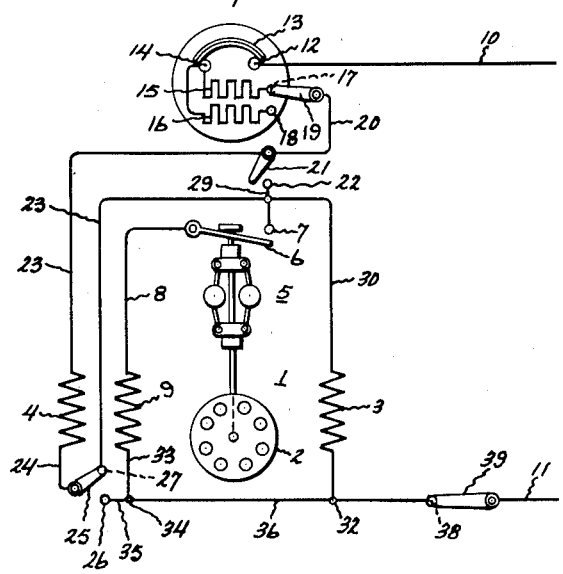

In the drawing, Figure 1 is a schematic diagram of a dual-voltage electric motor incorporating the improved protector arrangement of this invention, the motor being connected to operate at the lower voltage; and Figure 2 is a schematic diagram of the same electric motor when connected to operate at the higher voltage.

Referring now to the figures of the drawing, there is shown an alternating current induction motor, generally indicated at 1, having a conventional squirrel cage rotor member 2 and a pair of running windings 3 and 4. Rotor member 2 drives a centrifugal mechanism 5 which causes a contact arm 6 to separate from a stationary contact 7 at a predetermined speed. Contact arm 6 is connected by line 8 to a starting winding 9 which is physically displaced from windings 3 and 4 so that winding 9 is deenergized when rotor member 2 reaches the predetermined speed.

Motor 1 is connected across a source of alternating current power, such as a 115 or 230 volt 60 cycle source, by lines 10 and 11. Line 10 leads into a terminal 12 which is normally in electrical engagement with a bimetallic element 13. Bimetallic element 13 in turn normally engages a terminal 14 at its other end, through which it is serially connected to a pair of heating elements 15 and 16 which terminate respectively in a pair of terminals 17 and 18 alternatively engageable by a switch arm 19 which is connected to a line 20. Line 20 in turn leads to a contact arm 21 which is arranged to engage a terminal 22. Returning to a line 20, it extends past contact arm 21 into a line 23 leading to winding 4. On the other side of winding 4 a line 24 terminates in a contact arm 25 alternatively engageable with one of terminals 26 and 27. A line 28 connects terminals 27 and 22, and a line 29 connects terminal 22 and contact 7. Also extending from terminal 22 is a line 30 which leads to winding 3. On the other side of this winding there is a line 31 which terminates at point 32. Winding 9 is connected by a line 33 to a point 34 which in turn is joined to terminal 26 by a line 35. Another line 36 joins points 32 and 34, and from point 32 a line 37 extends to a terminal 38 engageable by a switch arm 39 to connect the motor 1 across the source of power by means of lines 10 and 11.

Referring now to Figure 1, for low voltage operation contact arm 39 will be closed across terminal 38, contact arm 21 will engage terminal 22, contact arm 19 will selectively engage terminal 18, and contact arm 25 will selectively engage terminal 26. With this arrangement, winding 3 will be energized, starting at terminal 38, through line 37, point 32, lines 31 and 30, terminal 22, contact arm 21, line 20, contact arm 19, terminal 18, heater element 16, terminal 14, bimetallic element 13, terminal 12, and line 10. Winding 4 is connected in parallel with the winding 3 through line 36, point 34, line 35, terminal 26, contact arm 25, and lines 24 and 23. Starting winding 9 is connected in parallel with both windings 3 and 4 through lines 33 and 8, contact arm 6, contact 7, and line 29. It will be seen from the foregoing that windings 3 and 4 are connected in parallel with each other and in series with the heating element 16 and the bimetallic element 13. The closing of switch 39 will cause energization of all three windings 3, 4, and 9, and the motor will start. At the predetermined speed of rotation, centrifugal mechanism 5 will pull down contact arm 6 to disconnect starting winding 9 and the motor will continue to run on windings 3 and 4.

The protection for these windings will be afforded by means of the heating element 16 and the bimetallic element 13, both of which are in series with the windings so that all the windings are de-energized when the predetermined temperature is reached.

Referring now to Figure 2, motor 1 may be connected for high voltage operation by engagement of contact arm 19 with terminal 17, engagement of contact arm 25 with terminal 27 and disengagement of contact arm 21 from terminal 22. In this case the running circuit, starting from terminal 38, will extend through line 37, point 32, line 31, winding 3, line 30, terminal 22, line 28, terminal 27, contact arm 25, line 24, winding 4, line 23, line 20, contact arm 19, terminal 17, heater element 15, terminal 14, bimetallic element 13, terminal 12, and line 10. Starting winding 9 is connected in parallel with the winding 3 through line 36, point 34, line 33, line 8, contact arm 6, contact 7, and line 29. When switch 39 is closed, the motor will start as before, and at the predetermined speed centrifugal mechanism 5 will pull down contact arm 6 to disconnect starting winding 9. It will be observed that, for the high voltage operation, windings 3 and 4 are connected in series, and that the bimetallic element 13 and the heater element 15 are in series with each other and with all of the windings so that undue heating will cause de-energization of the windings. It will also be observed that use of a different heating element 15 for the high voltage operation permits the use of a relatively high resistance bimetallic element 13 since the heating effect of the bimetallic element and of the heating element may be caused to compensate each other to obtain the same heating effect for both voltages. Normally, element 16 will have a relatively low resistance and element 15 a relatively high resistance in order to accommodate the different currents. For instance, the ratio of the resistance of elements 16 and 15 might be made 4–1 for a low resistance bimetallic element, assuming that the heater elements were located the same distance from the bimetallic element, or some higher value such as 10–1 for a moderate resistance bimetallic element. In addition, the use of two separate heating elements for the two voltages makes possible this advantage of a relatively high resistance bimetallic element while at the same time, the connections are such that all of the windings are positively de-energized upon operation of the bimetallic element.

While the invention has been described by an illustration involving entirely separate heating elements for each voltage operation, it will be understood that the inventive concept lies in two different heating resistances for the two voltage operations respectively. Also, it will be understood that, while individual switches have been shown for the changing of the connections for the sake of clarity, a standard terminal board arrangement (not shown) of the type well known in the art may be substituted without departing from applicant's inventive concept. Thus, while this invention has been explained by describing a particular embodiment thereof it will be apparent that improvements and modifications may be made without departing from the scope of the invention as defined in the appended claims.

What I claim as new and desire to secure by Letters Patent of the United States is:

1. A dual-voltage motor including a pair of windings, means for connecting said windings in parallel when said motor is operated at a first lower voltage and in series when said motor is operated at a second higher voltage, and means for protecting said windings from excessive heating comprising a bimetallic element adapted to be connected in series with the source of power for said motor, a pair of heating elements adjacent said bimetallic element, and means for connecting one of said heating elements and said bimetallic element in series with said windings when said windings are connected in parallel and for connecting the other of said heating elements and said bimetallic element in series with said windings when said windings are connected in series.

2. A dual-voltage motor including a pair of windings, means for connecting said windings in parallel when said motor is operated at a first lower voltage and in series when said motor is operated at a second higher voltage, and means for protecting said windings from excessive heating comprising a bimetallic element adapted to be connected in series with the source of power for said motor, a first relatively low resistance heating element adjacent said bimetallic element, a second relatively high resistance heating element adjacent said bimetallic element, and means for connecting said first heating element and said bimetallic element in series with said windings when said windings are connected in parallel, and for connecting said second heating element and said bimetallic element in series with said windings when said windings are connected in series.

3. A dual-voltage motor including a pair of run windings, means for connecting said windings in parallel when said motor is operated at a first lower voltage and in series when said motor is operated at a second higher voltage, a starting winding connected in parallel with one of said run windings, means arranged to disconnect said starting winding at a predetermined speed of rotation of said motor, and means for protecting all said windings from excessive heating comprising a bimetallic element adapted to be connected in series with the source of power for said motor, a first relatively low resistance heating element adjacent said bimetallic element, and a second relatively high resistance heating element adjacent said bimetallic element, and means for connecting said first heating element and said bimetallic element in series with said all windings when said run windings are connected in parallel, and for connecting said second heating element and said bimetallic element in series with all said windings when said run windings are connected in series.

4. A dual-voltage motor including a pair of windings, means for connecting said windings in parallel when said motor is operated at a first lower voltage and in series when said motor is operated at a second higher voltage, and means for protecting said windings from excessive heating comprising a bimetallic element adapted to be connected in series with the source of power for said motor, heating means comprising first and second predetermined resistances adjacent said bimetallic element, and means for connecting one of said resistances and said bimetallic element in series with said windings when said windings are connected in parallel and for connecting the other of said resistances and said bimetallic element in series with said windings when said windings are connected in series.

No references cited.